US012562869B2

(12) United States Patent
Zhang et al.

(10) Patent No.: US 12,562,869 B2
(45) Date of Patent: Feb. 24, 2026

(54) METHOD, DEVICE AND COMPUTER PROGRAM PRODUCT FOR WIRELESS COMMUNICATION

(71) Applicant: ZTE CORPORATION, Guangdong (CN)

(72) Inventors: Nan Zhang, Shenzhen (CN); Zhen Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 289 days.

(21) Appl. No.: 18/189,394

(22) Filed: Mar. 24, 2023

(65) Prior Publication Data

US 2023/0336307 A1     Oct. 19, 2023

Related U.S. Application Data

(63) Continuation of application No. PCT/CN2020/121607, filed on Oct. 16, 2020.

(51) Int. Cl.
H04L 5/00                (2006.01)

(52) U.S. Cl.
CPC .................................. H04L 5/0051 (2013.01)

(58) Field of Classification Search
None
See application file for complete search history.

(56) References Cited

U.S. PATENT DOCUMENTS

| | | | | | |
|---|---|---|---|---|---|
| 2012/0213186 A1* | 8/2012 | Ng | ......................... | H04L 5/0023 | |
| | | | | | 370/329 |
| 2012/0269285 A1* | 10/2012 | Jeong | .................. | H04L 27/2607 | |
| | | | | | 375/295 |
| 2013/0265951 A1* | 10/2013 | Ng | ......................... | H04W 72/23 | |
| | | | | | 370/329 |
| 2013/0294333 A1 | 11/2013 | Chen et al. | | | |
| 2015/0373694 A1* | 12/2015 | You | ........................ | H04L 5/0051 | |
| | | | | | 370/329 |
| 2016/0094326 A1* | 3/2016 | Moon | ........................ | H04L 5/14 | |
| | | | | | 370/330 |
| 2017/0126380 A1* | 5/2017 | Kim | ...................... | H04L 5/0048 | |
| 2018/0198495 A1* | 7/2018 | Davydov | .............. | H04L 1/1861 | |
| 2018/0212733 A1* | 7/2018 | Khoryaev | ............. | H04L 5/0007 | |
| 2018/0279352 A1* | 9/2018 | Chuang | ................. | H04L 5/0051 | |

(Continued)

FOREIGN PATENT DOCUMENTS

| | | |
|---|---|---|
| CN | 105122861 A | 12/2015 |
| CN | 107735976 A | 2/2018 |

(Continued)

OTHER PUBLICATIONS

First Office Action for CN Appl. No. 202080106166.5, dated Mar. 15, 2024 (with English translation, 17 pages).
Huawei, "DMRS PRB bundling discussion", 3GPP TSG RAN WG1 Meeting #61, R1-103097, May 14, 2010, Montreal, Quebec, Canada (7 pages).
LG Electronics, "Consideration on Downlink DM-RS PRB-bundling", 3GPP TSG RAN WG1 Meeting #60, R1-101234, Feb. 26, 2010, San Francisco, USA (5 pages).

(Continued)

*Primary Examiner* — Otis L Thompson, Jr.
(74) *Attorney, Agent, or Firm* — Foley & Lardner LLP

(57)                ABSTRACT

Method, device and computer program product for wireless communication are provided. A method includes: transmitting, by a first wireless communication node to a second wireless communication node, a demodulation reference signal (DM-RS) in first physical resource blocks (PRBs) of a plurality of PRBs according to an indictor provided by the first wireless communication node or the second wireless communication node.

18 Claims, 7 Drawing Sheets

100 transmitting, by the first wireless communication node to a second wireless communication node, a DM-RS in first PRBs of a plurality of PRBs according to an indictor provided by the first wireless communication node or the second wireless communication node
110

(56) References Cited

U.S. PATENT DOCUMENTS

| | | | | |
|---|---|---|---|---|
| 2018/0324760 | A1 | 11/2018 | Yuk et al. | |
| 2019/0052420 | A1* | 2/2019 | Manolakos | H04L 5/0051 |
| 2019/0097756 | A1* | 3/2019 | Chatterjee | H04L 1/0057 |
| 2019/0158326 | A1 | 5/2019 | Liao et al. | |
| 2019/0182822 | A1 | 6/2019 | Takeda et al. | |
| 2019/0253220 | A1* | 8/2019 | Kim | H04W 72/046 |
| 2020/0127786 | A1 | 4/2020 | Kwak et al. | |
| 2020/0137696 | A1* | 4/2020 | Liu | H04W 52/325 |
| 2020/0235962 | A1 | 7/2020 | Shi et al. | |
| 2021/0029647 | A1* | 1/2021 | Matsumura | H04W 52/18 |
| 2021/0076334 | A1* | 3/2021 | Liu | H04L 27/261 |
| 2021/0273774 | A1* | 9/2021 | Abotabl | H04W 72/0446 |
| 2022/0116937 | A1* | 4/2022 | Taherzadeh Boroujeni | H04W 72/21 |

FOREIGN PATENT DOCUMENTS

| | | |
|---|---|---|
| CN | 108631986 A | 10/2018 |
| CN | 108886448 A | 11/2018 |
| CN | 111295855 A | 6/2020 |
| WO | WO-2018/137516 A1 | 8/2018 |

OTHER PUBLICATIONS

Samsung, "PRB bundling for NR DMRS", 3GPP TSG RAN WG1 NR Ad-Hoc#2, R1-1710646, Jun. 30, 2017, Qingdao, P.R. China (5 pages).

International Search Report and Written Opinion for PCT Appl. No. PCT/CN2020/121607, mailed on Jun. 30, 2021 (7 pages).

Samsung, "PRB bundling for NR DMRS", 3GPP TSG RAN WG1 Meeting #90, R1-1713577, Aug. 25, 2017, Prague, Czechia (5 pages).

Extended European Search Report for EP Appl. No. 20957247.8, dated May 13, 2024 (11 pages).

Samsung, "PRB bundling for NR DMRS", 3GPP TSG RAN WG1 Meeting 90bis, R1-1717597, Oct. 13, 2017, Prague, CZ (7 pages).

Second Office Action for CN Appl. No. 202080106166.5, dated Aug. 20, 2024 (with English translation, 22 pages).

Office Action for ID Appl. No. P00202302896, dated Sep. 1, 2025 (with English translation, 6 pages).

* cited by examiner transmitting, by the first wireless communication node to a second wireless communication node, a DM-RS in first PRBs of a plurality of PRBs according to an indictor provided by the first wireless communication node or the second wireless communication node

Figure 2:
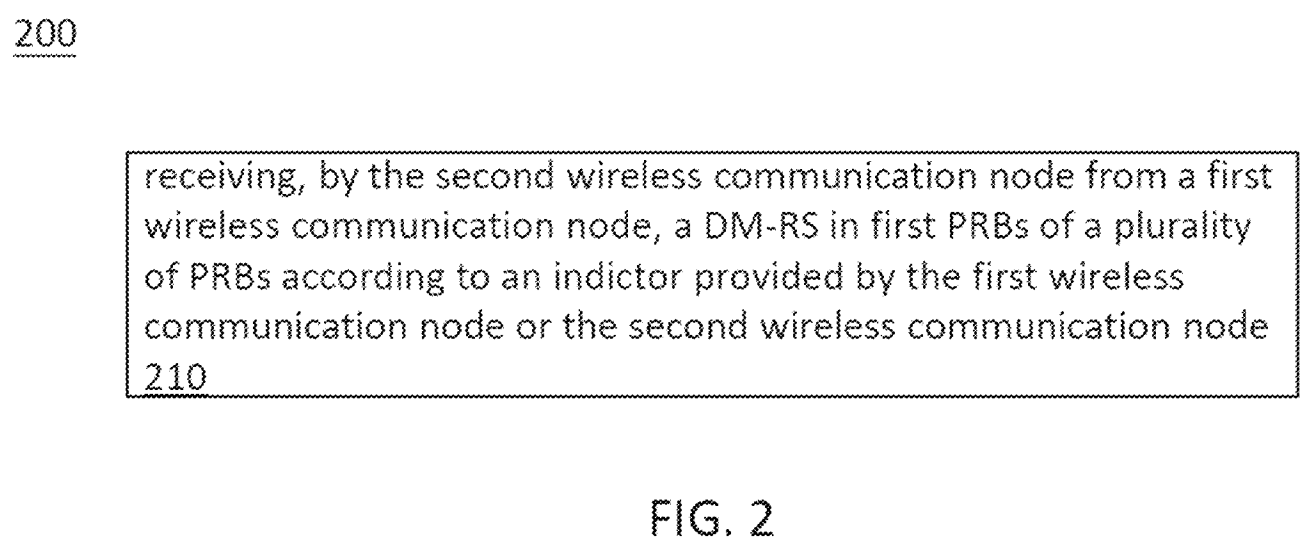

200 receiving, by the second wireless communication node from a first wireless communication node, a DM-RS in first PRBs of a plurality of PRBs according to an indictor provided by the first wireless communication node or the second wireless communication node
210

FIG. 2 resource element with DM-RS

SBL

PRB4    PRB3    PRB2    PRB1 frequency time resource element with DM-RS

METHOD, DEVICE AND COMPUTER PROGRAM PRODUCT FOR WIRELESS COMMUNICATION

This application is a continuation of PCT/CN2020/121607, filed Oct. 16, 2020, the content of which is incorporated herein by reference in its entirety.

TECHNICAL FIELD

The present disclosure is generally directed to wireless communication. In particular, the present disclosure is directed to a method, device, and computer program product for wireless communication. In particular, the present disclosure relates to 5G wireless communication.

BACKGROUND

In existing systems, the design of a reference signal (RS), e.g., the demodulation reference signal (DM-RS), mainly targets to transmission scenarios with different channel conditions, to ensure system efficiency. For example, the same pattern of the DM-RS is applied per scheduling unit (e.g. resource block RB and slot or sub-slot in existing specifications) within the resource occupied by the scheduled channel. In other words, regarding the time domain behavior of the DM-RS, the same pattern of DM-RS is repeated across slots in case of aggregated transmission or repetition.

SUMMARY

In 5G, many parameters (e.g. a DM-RS-type, the number of front-loaded DM-RSs, the number of additional DM-RSs) are used to define the repeated pattern and are configured by the higher layer signaling. In this context, the supported number of DM-RS ports is also determined by code-division multiplexing (CDM) group by introducing either orthogonal cover code (OCC) in time/frequency or cyclic shift (CS) shift. The capacity for current DM-RS design supports 8 and 12 ports for DM-RS type 1 and 2, respectively. In other cases, the DM-RS location is fixed within the allocation region. For example, in long term evolution category M1 (LTE-M), the DM-RS is always transmitted in the resource with a symbol index equal to 3. In the narrowband internet of things (NB-IoT), the allocation time domain resource for the DM-RS of physical uplink shared channel (PUSCH) is coupled with the corresponding format of the PUSCH.

When analyzing the channel condition, the channel condition is characterized mainly by two aspects: frequency selectivity and time-variant behavior. The frequency selectivity is determined by the condition of multiple paths. When there are more multiple paths, more channels in the frequency domain are available. The time variant behavior is determined jointly by the multiple paths and mobility. However, frequency offset estimation becomes more difficult with an increasing number of multiple paths.

The present disclosure relates to methods, devices, and computer program products for wireless communication, which can reduce the overhead of the DM-RS, and as a result making the allocation of reference signals more flexible.

One aspect of the present disclosure relates to a wireless communication method. In an embodiment, the wireless communication method includes: transmitting, by a first wireless communication node to a second wireless communication node, a demodulation reference signal, DM-RS, in first physical resource blocks, PRBs, of a plurality of PRBs according to an indictor provided by the first wireless communication node or the second wireless communication node.

Another aspect of the present disclosure relates to a wireless communication method. In an embodiment, the wireless communication method includes: receiving, by a second wireless communication node from a first wireless communication node, a demodulation reference signal, DM-RS, in first physical resource blocks, PRBs, of a plurality of PRBs according to an indictor provided by the first wireless communication node or the second wireless communication node.

Another aspect of the present disclosure relates to a wireless communication node. In an embodiment, the wireless communication node includes a communication unit and a processor. The processor is configured to transmit, to another wireless communication node, a demodulation reference signal, DM-RS in first physical resource blocks, PRBs, of a plurality of PRBs according to an indictor provided by the wireless communication node or the another wireless communication node.

Another aspect of the present disclosure relates to a wireless communication node. In an embodiment, the wireless communication node includes a communication unit and a processor. The processor is configured to receive, from another wireless communication node, a demodulation reference signal, DM-RS, in first physical resource blocks, PRBs, of a plurality of PRBs according to an indictor provided by the first wireless communication node or the another wireless communication node.

Various embodiments may preferably implement the features below.

Preferably or in some implementations, two adjacent first PRBs of the first PRBs are separated by one or more second PRBs not carrying DM-RS in the frequency domain, in which the number of second PRBs determined by the indicator.

Preferably or in some implementations, the first PRBs carrying the DM-RS are equally spaced or distributed in the frequency domain, in which a gap between the first PRBs carrying the DM-RS is determined by the indicator.

Preferably or in some implementations, the indicator is provided by the first wireless communication node or the second wireless communication node via a Radio Resource Control, RRC, signaling or a Medium Access Control Control Element, MAC CE, command.

Preferably or in some implementations, the indicator is determined by one of following: a PRB bundling size; or a resource block group, RBG, size.

Preferably or in some implementations, a number of the one or more second PRBs between the two adjacent first PRBs of the first PRBs not carrying DM-RS in the frequency domain corresponds to a PRB bundling size and the indicator provided by the first wireless communication node or the second wireless communication node.

Preferably or in some implementations, a PRB bundling size is larger than or equal to a predetermined threshold, and a number of the one or more second PRBs between the two adjacent first PRBs of the first PRBs not carrying DM-RS in the frequency domain is determined by the indicator provided by the first wireless communication node or the second wireless communication node.

Preferably or in some implementations, under a condition that a PRB bundling size is larger than or equal to a predetermined threshold, a number of the one or more second PRBs between the two adjacent first PRBs of the first PRBs not carrying DM-RS in the frequency domain is determined by the indicator provided by the first wireless communication node or the second wireless communication node.

Preferably or in some implementations, the number of the one or more second PRBs between the two adjacent first PRBs of the first PRBs not carrying DM-RS is less than the PRB bundling size.

Preferably or in some implementations, the first PRBs carrying the DM-RS are equally spaced or distributed in the frequency domain, in which a gap between the first PRBs carrying the DM-RS corresponds to a PRB bundling size and the indicator provided by the first wireless communication node or the second wireless communication node.

Preferably or in some implementations, a PRB bundling size is larger than or equal to a predetermined threshold, and a gap between the first PRBs carrying the DM-RS is determined by the indicator provided by the first wireless communication node or the second wireless communication node.

Preferably or in some implementations, under a condition that a PRB bundling size is larger than or equal to a predetermined threshold, a gap between the first PRBs carrying the DM-RS is determined by the indicator provided by the first wireless communication node or the second wireless communication node.

Preferably or in some implementations, the gap between the first PRBs carrying the DM-RS is less than the PRB bundling size.

Preferably or in some implementations, a number of the one or more second PRBs between the two adjacent first PRBs of the first PRBs not carrying DM-RS in the frequency domain corresponds to a resource block group, RBG, size.

Preferably or in some implementations, a number of the one or more second PRBs between the two adjacent first PRBs of the first PRBs not carrying DM-RS in the frequency domain corresponds to a RBG size and the indicator provided by the first wireless communication node or the second wireless communication node.

Preferably or in some implementations, a RBG size is larger than or equal to a predetermined threshold, and a number of the one or more second PRBs between the two adjacent first PRBs of the first PRBs not carrying DM-RS in the frequency domain is determined by the indicator provided by the first wireless communication node or the second wireless communication node.

Preferably or in some implementations, under a condition that a RBG size is larger than or equal to a predetermined threshold, a number of the one or more second PRBs between the two adjacent first PRBs of the first PRBs not carrying DM-RS in the frequency domain is determined by the indicator provided by the first wireless communication node or the second wireless communication node.

Preferably or in some implementations, the number of the one or more second PRBs between the two adjacent first PRBs of the first PRBs not carrying DM-RS is less than the RBG size.

Preferably or in some implementations, a power of the DM-RS in the first PRBs is boosted corresponding to one or more second PRBs in the PRBs carrying no DM-RS.

Preferably or in some implementations, a power of the DM-RS in the first PRBs is boosted corresponding to a number of one or more second PRBs between two adjacent first PRBs of the first PRBs in the frequency domain.

Preferably or in some implementations, a power of the DM-RS in the first PRBs is boosted corresponding to the indictor provided by the first wireless communication node or the second wireless communication node.

Preferably or in some implementations, a power of the DM-RS in the first PRBs is operably boosted corresponding to the indictor and an upper limit of power boosting.

Preferably or in some implementations, the indictor is determined corresponding to an upper limit of power boosting.

Preferably or in some implementations, numbers of one or more second PRBs between two adjacent first PRBs of the first PRBs not carrying DM-RS in the frequency domain are the same in different time slots.

Preferably or in some implementations, energy per resource element, EPRE, of the power boosted DM-RS in the first PRBs are the same in different time slots.

Preferably or in some implementations, a ratio of Physical Downlink Shared Channel, PDSCH, EPRE to a power boosted DM-RS EPRE corresponding the indictor is X dB, a ratio of PDSCH EPRE to DM-RS EPRE corresponding to the number of DM-RS CDM groups without data is Y dB, an upper limit of overall power boosting is Z dB, and X, Y, Z conform the follows:

$$|X|+|Y|\leq|Z|$$

in which X, Y, Z are non-positive numbers.

Preferably or in some implementations, a ratio of PDSCH EPRE to a power boosted DM-RS EPRE corresponding to the number of DM-RS CDM groups without data is Y dB, an upper limit of overall power boosting is Z dB, and $|Y|\geq|Z|$, and the first wireless communication node does not boost a power of the DM-RS in the first PRBs corresponding to the indictor.

Preferably or in some implementations, a ratio of PDSCH EPRE to a power boosted DM-RS EPRE corresponding to the number of DM-RS CDM groups without data is Y dB, an upper limit of overall power boosting is Z dB, and under a condition that $|Y|\geq|Z|$, the first wireless communication node does not boost a power of the DM-RS in the first PRBs corresponding to the indictor.

Preferably or in some implementations, a ratio of Physical Downlink Shared Channel, PDSCH, EPRE to a power boosted DM-RS EPRE corresponding to the indictor is estimated to be X dB, a ratio of PDSCH EPRE to DM-RS EPRE corresponding to the number of DM-RS CDM groups without data is Y dB, an upper limit of overall power boosting is Z dB, and $|X|+|Y|\geq|Z|$, and the first wireless communication node does not boost a power of the DM-RS in the first PRBs corresponding to the indictor.

Preferably or in some implementations, a ratio of Physical Downlink Shared Channel, PDSCH, EPRE to a power boosted DM-RS EPRE corresponding to the indictor is estimated to be X dB, a ratio of PDSCH EPRE to DM-RS EPRE corresponding to the number of DM-RS CDM groups without data is Y dB, an upper limit of overall power boosting is Z dB, and under a condition that $|X|+|Y|\geq|Z|$, the first wireless communication node does not boost a power of the DM-RS in the first PRBs corresponding to the indictor.

Preferably or in some implementations, two adjacent first PRBs of the first PRBs are separated by one or more second PRBs in the frequency domain, the one or more second PRBs carry another DM-RS corresponding to another second wireless communication node.

Preferably or in some implementations, a frequency offset of the DM-RS carried by the first PRBs and a frequency offset of the DM-RS carried by the one or more second PRBs are different.

Preferably or in some implementations, two adjacent first PRBs of the first PRBs are separated by one or more second PRBs in the frequency domain, and the one or more second PRBs are used for interference measurement.

The present disclosure also relates to a computer program product including a computer-readable program medium code stored thereupon, the code, when executed by a processor, causing the processor to implement a wireless communication method recited in any of foregoing methods.

The above and other aspects and their implementations are described in greater detail in the drawings, the descriptions, and the claims.

BRIEF DESCRIPTION OF THE DRAWINGS

FIG. 1 illustrates a wireless communication method according to an embodiment of the present disclosure;

FIG. 2 illustrates another wireless communication method according to an embodiment of the present disclosure;

DETAILED DESCRIPTION

Figure 3:
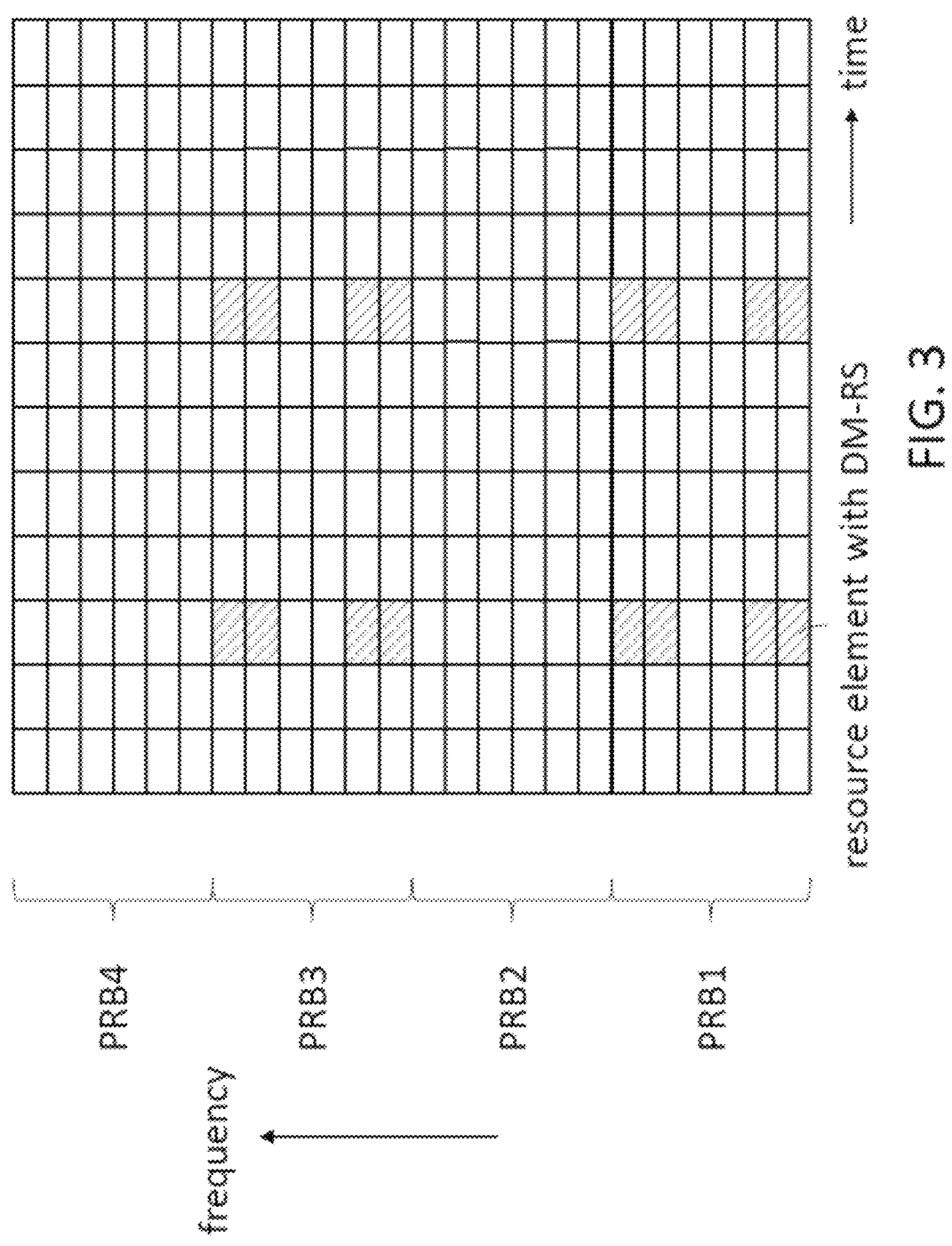
FIG. 3 illustrates an example of DM-RS overhead reduction according to an embodiment of the present disclosure.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

One aspect of the present disclosure is related to a wireless communication method corresponding to DM-RS overhead reduction.

Figure 1:
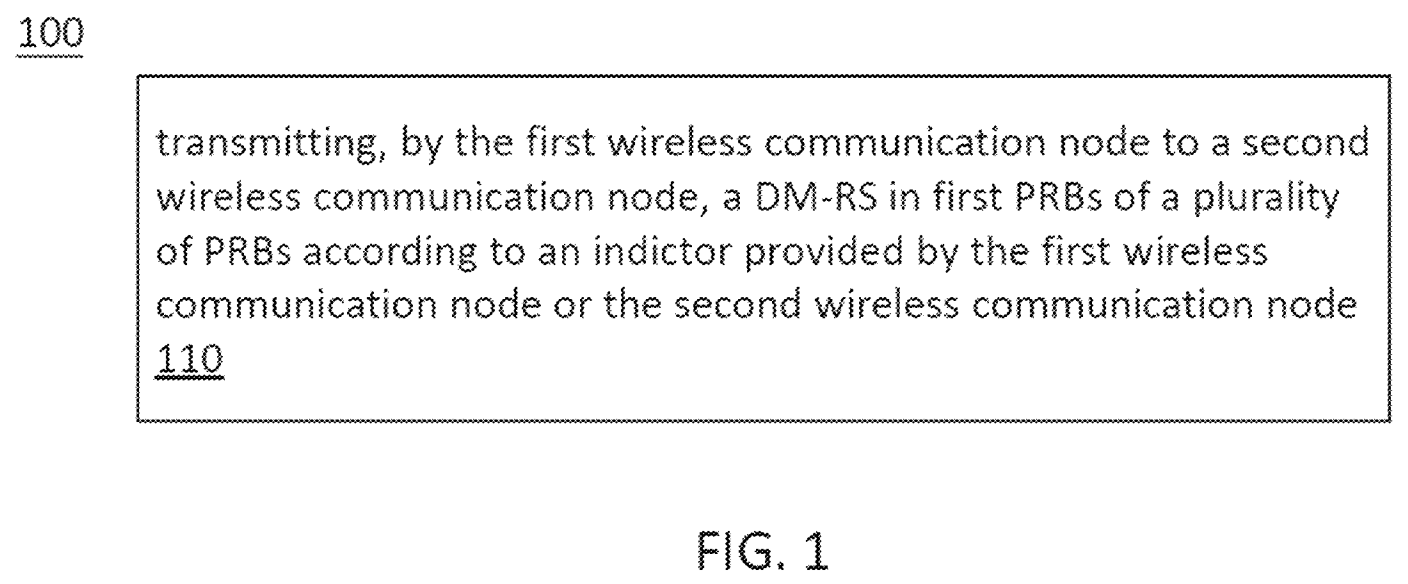

FIG. 1 illustrates a wireless communication method 100 according to an embodiment of the present disclosure. In an embodiment, the wireless communication method 100 can be performed by using a first wireless communication node, which can be a terminal device (e.g., a user equipment (UE)) or a network device (e.g., a base station (BS)) transmitting a DM-RS. In the paragraph below, a first wireless communication node will be used in a descriptive example, but the present disclosure is not limited in this regard. Details of the first wireless communication node can be ascertained by referring to the paragraphs related to FIG. 6 below.

In an embodiment, the wireless communication method 100 includes operation 110.

Operation 110 includes transmitting, by the first wireless communication node to a second wireless communication node, a demodulation reference signal (DM-RS) in first physical resource blocks (PRBs) of a plurality of PRBs according to an indictor provided by the first wireless communication node or the second wireless communication node.

Through such a method, the overhead of the DM-RS transmitted by the first wireless communication node can be reduced, and the allocation of reference signals can be more flexible.

In an embodiment, a second wireless communication node can be a terminal device (e.g., a user equipment (UE)) or a network device (e.g., a base station (BS)). In the paragraphs below, the first wireless communication node is used to describe the node transmitting a DM-RS, and the first wireless communication node is used to describe the node receiving the DM-RS. In some embodiment, when the first wireless communication node is a terminal device (e.g., a user equipment (UE)), the second wireless communication node is a network device (e.g., a base station (BS)), and vice versa.

In an embodiment, the indicator is provided (e.g., determined or configured) by one of the first wireless communication node or the second wireless communication node which is a network device (e.g., a base station (BS)). In an embodiment, the network device (one of the first and second wireless communication nodes) determines or configure the indicator (e.g., a parameter) for downlink or uplink transmissions, and transmit the indicator to the terminal node (another one of the first and second wireless communication nodes).

In an embodiment, two adjacent first PRBs of the first PRBs are separated by one or more second PRBs not carrying the DM-RS in the frequency domain. In an embodiment, the number of second PRBs determined by the indicator. In the following paragraphs, the first PRBs are used to indicate the PRBs carrying the DM-RS, and the second PRBs are used to indicate the PRBs not carrying the DM-RS or carrying a DM-RS relevant to another node.

Details of the method 100 would be described in embodiments below.

FIG. 2 illustrates a wireless communication method 200 according to an embodiment of the present disclosure. In an embodiment, the wireless communication method 200 can be performed by using a second wireless communication node, which can be a terminal device (e.g., a user equipment (UE)) or a network device (e.g., a base station (BS)) receiving a DM-RS. In the paragraphs below, a second wireless communication node will be used in a descriptive example, but the present disclosure is not limited in this regard. Details of the second wireless communication node can be ascertained by referring to the paragraphs related to FIG. 7 below.

In an embodiment, the wireless communication method 200 includes operation 210.

Operation 210 includes receiving, by the second wireless communication node from a first wireless communication node, a DM-RS in first PRBs of a plurality of PRBs according to an indictor provided by the first wireless communication node or the second wireless communication node.

Through such a method, the overhead of the DM-RS transmitted by the first wireless communication node can be reduced, and the allocation of reference signals can be more flexible.

Details of the first and second wireless communication nodes and the first and second PRBs can be ascertained by reference to the paragraphs above, and will not be repeated herein.

In an embodiment, the indicator is provided (e.g., determined or configured) by one of the first wireless communication node or the second wireless communication node which is a network device (e.g., a base station (BS)). In an embodiment, the network device (one of the first and second wireless communication nodes) determines or configure the indicator (e.g., a parameter) for downlink or uplink transmissions, and transmit the indicator to the terminal node (another one of the first and second wireless communication nodes).

Details of the method 200 would be described in embodiments below.

In the following paragraphs, many aspects of the DM-RS overhead reduction are described in the example examples below, but the present disclosure is not limited to these examples.

Aspect 1: Configuration for DM-RS Overhead Reduction

Aspect 1—Case 1:

In some embodiments in Case 1, the network device can explicitly indicate one or more parameters in the indicator to reduce or down-sample the transmissions of DM-RS in the frequency domain.

In some embodiments, the network device can directly configure an indicator as a value X (e.g., 2) to reducing or down sampling the transmission of DM-RS in the frequency domain. In some embodiments, the DM-RS is allocated in one PRB of X (e.g., 2) consecutive PRBs in the frequency domain.

In some embodiment, a first PRB with DM-RS can be the PRB of X (e.g., 2) with either lowest/highest PRB index or middle one of X PRBs.

For an example illustrated in FIG. 3, when X is 2, the DM-RS is allocated in one first PRB of 2 consecutive PRBs in the frequency domain (e.g., allocated in PRB1 and PRB3 in PRB1-PRB4). In this example, the second PRBs (e.g., PRB2 and PRB4) do not carry the DM-RS.

In some embodiments, the first PRBs carrying the DM-RS are equally spaced or distributed in the frequency domain. In an embodiment, a gap or space between the first PRBs carrying the DM-RS in the frequency domain is determined by the indicator. In an embodiment, the density of the first PRBs carrying the DM-RS in the frequency domain is determined by the indicator.

In some embodiments, a number of one or more second PRBs between two adjacent first PRBs (e.g., PRB1 and PRB3 in FIG. 3) of the PRBs in the frequency domain are the same in different time slots. In some embodiments, the gaps or spaces between the first PRBs carrying the DM-RS in the frequency domain are the same in different time slots. In some embodiments, the densities of the first PRBs carrying the DM-RS in the frequency domain in different time slots.

In some embodiments, the indicator is provided by the network device via a Radio Resource Control (RRC) signaling or a Medium Access Control Control Element (MAC CE) command.

In some embodiments, the indicator can be is determined by one of a PRB bundling size (see Aspect 1—Case 2a below) or a resource block group (RBG) size (see Aspect 1—Case 2b below). In some embodiments, the indicator can be one of the PRB bundling size or the RBG size.

It should be noticed that, through an embodiment above, no additional signal to enable/disable the functionality of DM-RS overhead reduction is needed. For example, in the case that the indicator is configured with a value other than 1, this functionality is enabled. In the case that the indicator is configured with a value of 1, this functionality is disabled. Aspect 1—Case 2a:

In some embodiments in Case 2a, the network device can implicitly indicate one or more parameters to reduce or down-sample the transmissions of the DM-RS in the frequency domain.

In some embodiments, the parameter to determine the number ratio for DM-RS overhead reduction is implicitly indicated, e.g., via coupled with other parameters. In some embodiments, the value for a PRB bundling size is used for DM-RS overhead reduction.

In some embodiments, a number of the one or more second PRBs between the two adjacent first PRBs of the first PRBs not carrying DM-RS in the frequency domain corresponds to a PRB bundling size and the indicator provided by the first wireless communication node or the second wireless communication node. From a different perspective, the gap between the first PRBs carrying the DM-RS corresponds to the PRB bundling size and the indicator provided by the network device.

In some embodiments, the PRB bundling size is larger than or equal to a predetermined threshold, and the number of the one or more second PRBs between two adjacent first PRBs is determined by the indicator provided by the network device. From a different perspective, the PRB bundling size is larger than or equal to a predetermined threshold, and the gap between the first PRBs carrying the DM-RS is determined by the indicator provided by the network device.

For example, when the PRB bundling size is 2, the gap between the first PRBs is 2.

When the PRB bundling size is 4 or wideband, the gap is determined by the value in the indicator (e.g., 2 or 3). In such embodiments, the number of the one or more second PRBs between the two adjacent first PRBs of the first PRBs not carrying DM-RS is less than the PRB bundling size. That is, the gap between the first PRBs carrying the DM-RS is less than the PRB bundling size.

In some embodiments, the network device determines the gap that is not larger than the PRB bundling size.

In some embodiments, the network device provides a signaling to explicitly enable the functionality for DM-RS overhead reduction.

In some embodiments, the selection of the PRBs without the DM-RS (i.e., the second PRBs) follows the PRB boundary definition for PRB bundling.

In some embodiments, once the network device provides the signaling to enable the functionality of DM-RS overhead reduction to the terminal device, the terminal device is configured to perform the DM-RS overhead reduction (e.g., transmit and/or receive the first and second PRBs) according to the value of the PRB bundling size.

Aspect 1—Case 2b:

In some embodiments in Case 2a, the network device can implicitly indicate one or more parameters to reduce or down-sample the transmissions of the DM-RS in the frequency domain.

In some embodiments, the parameter to determine the number ratio for DM-RS overhead reduction is implicitly indicated, e.g., via coupled with other parameters. In some embodiments, the value for a resource block group (RBG) size is used for DM-RS overhead reduction.

In some embodiments, a number of the one or more second PRBs between the two adjacent first PRBs of the first PRBs not carrying DM-RS in the frequency domain corresponds to a RBG size and the indicator provided by the first wireless communication node or the second wireless communication node. From a different perspective, the gap between the first PRBs carrying the DM-RS corresponds to the RBG size and the indicator provided by the network device.

In some embodiments, the RBG size is larger than or equal to a predetermined threshold, and the number of the one or more second PRBs between two adjacent first PRBs is determined by the indicator provided by the network device. From a different perspective, the RBG size is larger than or equal to a predetermined threshold, and the gap between the first PRBs carrying the DM-RS is determined by the indicator provided by the network device.

For example, when the RBG size is 2, the gap between the first PRBs is 2.

When the RBG size is 4 or wideband, the gap is determined by the value in the indicator (e.g., 2 or 3). In such embodiments, the number of the one or more second PRBs between the two adjacent first PRBs of the first PRBs not carrying DM-RS is less than the RBG size. That is, the gap between the first PRBs carrying the DM-RS is less than the RBG size.

In some embodiments, the network device determines the gap that is not larger than the RBG size.

In some embodiments, the network device provides a signaling to explicitly enable the functionality for DM-RS overhead reduction.

In some embodiments, the selection of the PRBs without the DM-RS (i.e., the second PRBs) follows the PRB boundary definition for RBG.

In some embodiments, once the network device provides the signaling to enable the functionality of DM-RS overhead reduction to the terminal device, the terminal device is configured to perform the DM-RS overhead reduction (e.g., transmit and/or receive the first and second PRBs) according to the value of the RBG size.

Aspect 2: Configurations Alone with DM-RS Overhead Reduction

Aspect 2—Case 1: Power Boosting

In some approaches, the powers of DM-RS are the same over the PRBs due to the repeated pattern allocation.

In some embodiments, in response to the functionality of DM-RS overhead reduction is enabled, the power of the DM-RS in the PRBs would be boosted (e.g., increased).

In some embodiments, a power of the DM-RS in the first PRBs is boosted corresponding to the one or more second PRBs in the PRBs carrying no DM-RS.

For example, as illustrated in FIG. 3, since the second PRBs (i.e., PRB2, PRB4) do not carry the DM-RS, the power of the DM-RS in the first PRBs is boosted accordingly.

In some embodiments, a power of the DM-RS in the first PRBs is boosted corresponding to a number of the one or more second PRBs between two adjacent first PRBs of the first PRBs in the frequency domain. From a different perspective, a power of the DM-RS in the first PRBs is boosted corresponding to the indictor provided by the first wireless communication node or the second wireless communication node.

In some embodiments, in the case that the DM-RS is allocated in one first PRB of X consecutive PRBs in the frequency domain, the power of the DM-RS is boosted X times (or $10*\log_{10}(X)$ dB).

For example, in the case of X is 2, as illustrated in FIG. 3, the power of DM-RS in PRB1 and PRB3 can be boosted by 2 times (or $10*\log_{10}(2)$ dB) since no DM-RS will be transmitted in PRB2 and PRB4.

In some embodiments, the first and/or second wireless communication node may have an upper limit for power boosting. In some embodiments, a power of the DM-RS in the first PRBs is operably boosted corresponding to the indictor and an upper limit of power boosting. In some embodiments, the power of the DM-RS in the first PRBs is operably boosted corresponding to a number of one or more second PRBs between two adjacent first PRBs of the first PRBs in the frequency domain and an upper limit of power boosting. In some embodiments, once the value of power boosting due to the DM-RS overhead reduction would be larger than the upper limit, the first and/or second wireless communication node would not boost the power of the DM-RS in the first PRBs.

In some embodiments, the indictor is determined corresponding to an upper limit of power boosting. In some embodiments, the number of the PRB(s) not carrying DM-RS between two adjacent PRBs carrying DM-RS in the frequency domain is determined corresponding to the upper limit of power boosting. In some embodiments, once the power boosting due to the DM-RS overhead reduction is enabled, the indicator (e.g., the value X as described above) should be also restricted by the upper limit of power boosting.

Figure 4:
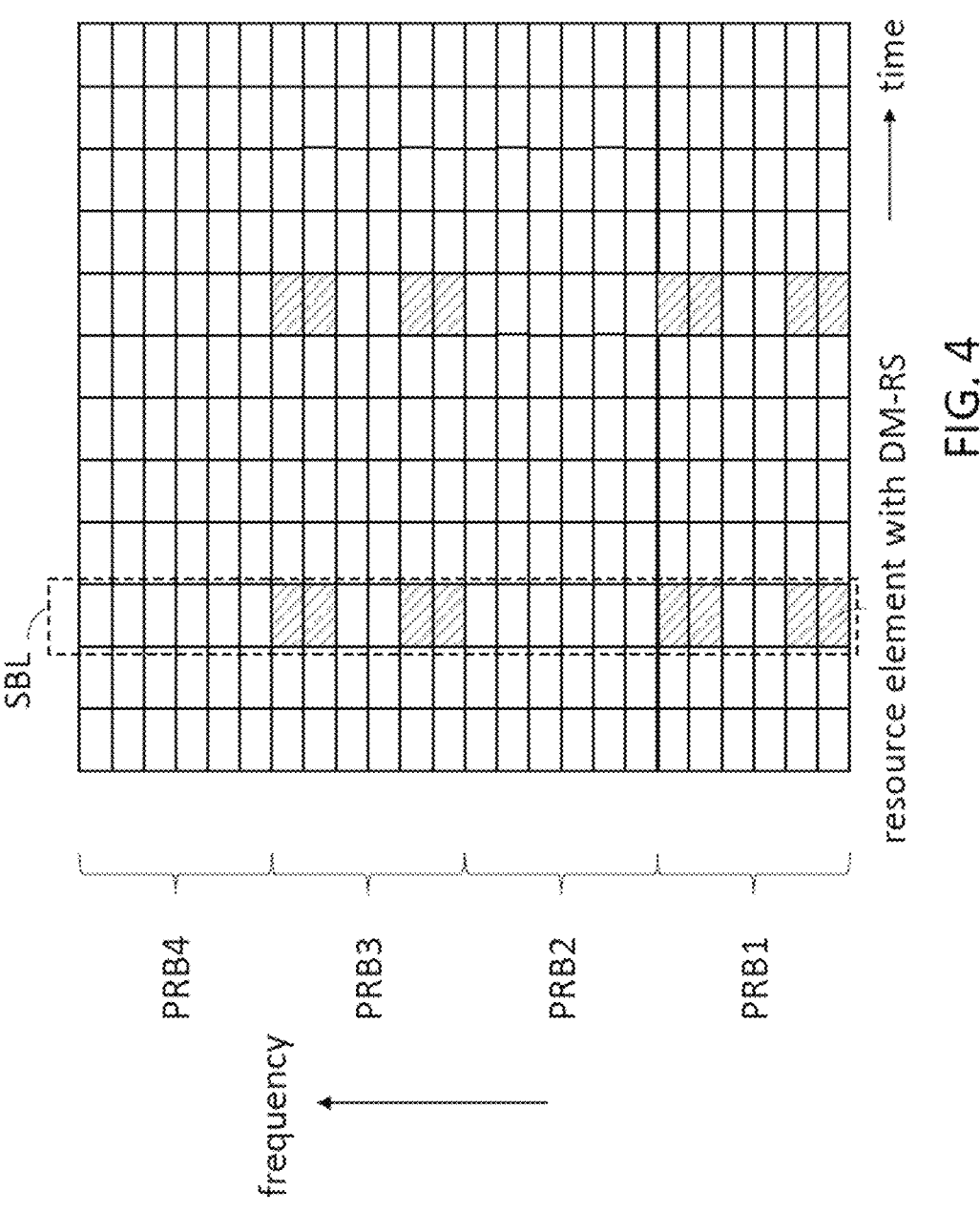
FIG. 4 illustrates another example of DM-RS overhead reduction according to an embodiment of the present disclosure.

In some embodiments, in the case of the DM-RS overhead reduction is enabled jointly in both time and frequency domain, the power boosting is enabled for the DM-RS in the same symbol. For example, as illustrated in FIG. 4, the power boosting is enabled for the DM-RS in the symbol SBL.

In some embodiments, energy per resource element (EPRE) of the power boosted DM-RS in the first PRBs are the same in different time slots. In some embodiments, energy per resource element (EPRE) of the power boosted DM-RS in the first PRBs corresponding to the indicator are the same in different time slots.

In some embodiments, in case of aggregation transmission, same ratio for DM-RS overhead reduction should be ensured cross slots. It also means that: same energy per resource element (EPRE) of DM-RS should be kept cross slots after boosting due to the DM-RS overhead reduction.

Aspect 2—Case 1a: Power Boosting

In some approaches, power boosting is supported for DM-RS in the case that non-MU scheduling is enabled. Such information can be determined by the indication in DCI, i.e., DM-RS port indication.

In some embodiments, in response to the functionality of DM-RS overhead reduction is enabled, the power of the DM-RS in the PRBs would be boosted (e.g., increased) corresponding to both the indication and the number of DM-RS Code Division Multiplexing (CDM) groups without data.

In some embodiments, the network device provides a signaling to enable the power boosting of the DM-RS in the PRBs due to the DM-RS overhead reduction.

In some embodiments, assuming a ratio of Physical Downlink Shared Channel (PDSCH) EPRE to a power boosted DM-RS EPRE corresponding the indictor is X dB, a ratio of PDSCH EPRE to DM-RS EPRE corresponding to the number of DM-RS CDM groups without data is Y dB, an upper limit of overall power boosting (e.g., the ratio of PDSCH EPRE to DM-RS EPRE) is Z dB, and X, Y, Z conform the follows:

$$X+Y \geq Z$$

or $$|X|+|Y| \leq |Z|,$$

in which X, Y, Z are non-positive numbers.

In some embodiments, following the denotations used above, in response to $|Y| \geq |Z|$, the first or second wireless communication node transmitting the DM-RS does not boost the power of the DM-RS in the PRBs corresponding to the indictor.

In some embodiments, assuming a ratio of Physical Downlink Shared Channel (PDSCH) EPRE to a power boosted DM-RS EPRE corresponding the indictor is estimated to be X dB, a ratio of PDSCH EPRE to DM-RS EPRE corresponding to the number of DM-RS CDM groups without data is Y dB, an upper limit of overall power boosting (e.g., the ratio of PDSCH EPRE to DM-RS EPRE) is Z dB, in response to $|X|+|Y| \geq |Z|$, the first or second wireless communication node transmitting the DM-RS does not boost a power of the DM-RS in the PRBs corresponding to the indictor.

Aspect 2—Case 2: DM-RS Capacity Enhancement

In some embodiments, in the case of the DM-RS overhead reduction (in either time domain or frequency domain) is enabled, the resource elements (REs) can be used for other terminal devices.

Figure 5:
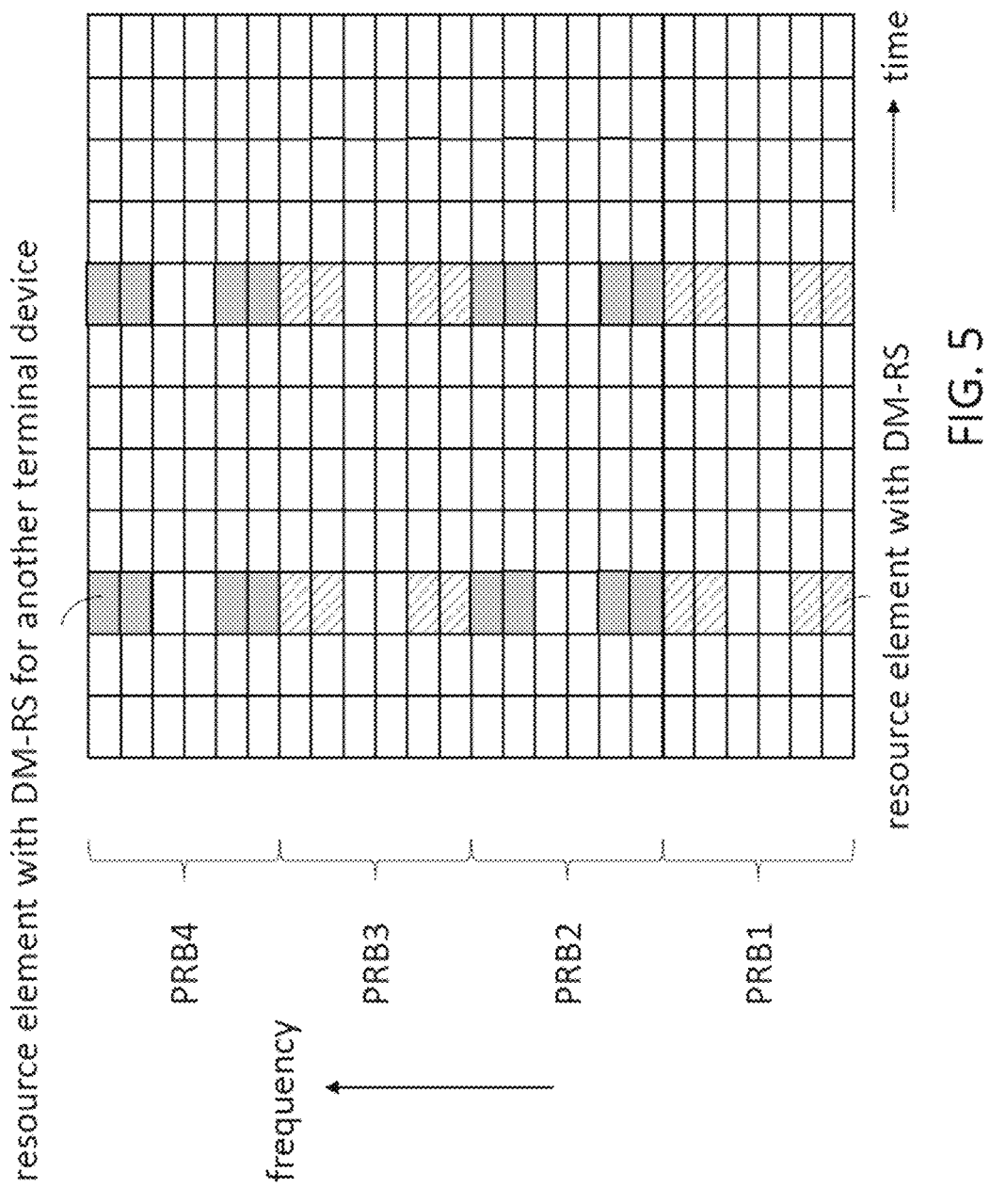
FIG. 5 illustrates still another example of DM-RS overhead reduction according to an embodiment of the present disclosure.

For example, as illustrated in FIG. 5, PRB2 and PRB4 carrying DM-RS for another terminal device.

In some embodiments, the first PRB carrying the DM-RS after DM-RS overhead reduction can be configured by the network device.

In some embodiments, offsets on the PRB index can be configured to the terminal devices. For example, the first PRBs with a first offset (e.g., 0) is the first one of X PRB, and the second PRBs with a second offset (e.g., 1) is the second one of X PRB. Referring to FIG. 5, PRB1 and PRB3 can be PRBs with an offset of 0, and PRB2 and PRB4 can be PRBs with an offset of 1.

Accordingly, in some embodiments, two adjacent first PRBs of the first PRBs are separated by one or more second PRBs in the frequency domain, the one or more second PRBs carry another DM-RS corresponding to another second wireless communication node. In some embodiments, a frequency offset of the DM-RS carried by the first PRBs and a frequency offset of the DM-RS carried by the one or more second PRBs are different. In some embodiments, the frequency offset of the DM-RS carried by the first PRBs and a frequency offset of the DM-RS carried by the one or more second PRBs are configured by the network device.

Aspect 2—Case 3: Enhancement on Measurement

In some embodiments, in the case of the DM-RS overhead reduction (in either time domain or frequency domain) is enabled, the spare REs (no DM-RS is transmitted after DM-RS overhead reduction) can be used for interference measurement or transmission of other reference signals.

In some embodiments, these spare REs can be used as Channel State Information Reference Signal (CSI-RS) interference measurement (IM) resource in the case of downlink channel.

From another aspect, in some embodiments, the second PRBs between two adjacent first PRBs are used for interference measurement. In some embodiments, the second PRBs are used for interference measurement. In some embodiments, the REs in the second PRBs at a location corresponding to the REs in the first PRBs for the DM-RS are used for interference measurement. In some embodiments, the REs in the second PRBs at the location corresponding to the REs in the first PRBs for the DM-RS are used as CSI-RS IM resource in the downlink channel.

Figure 6:
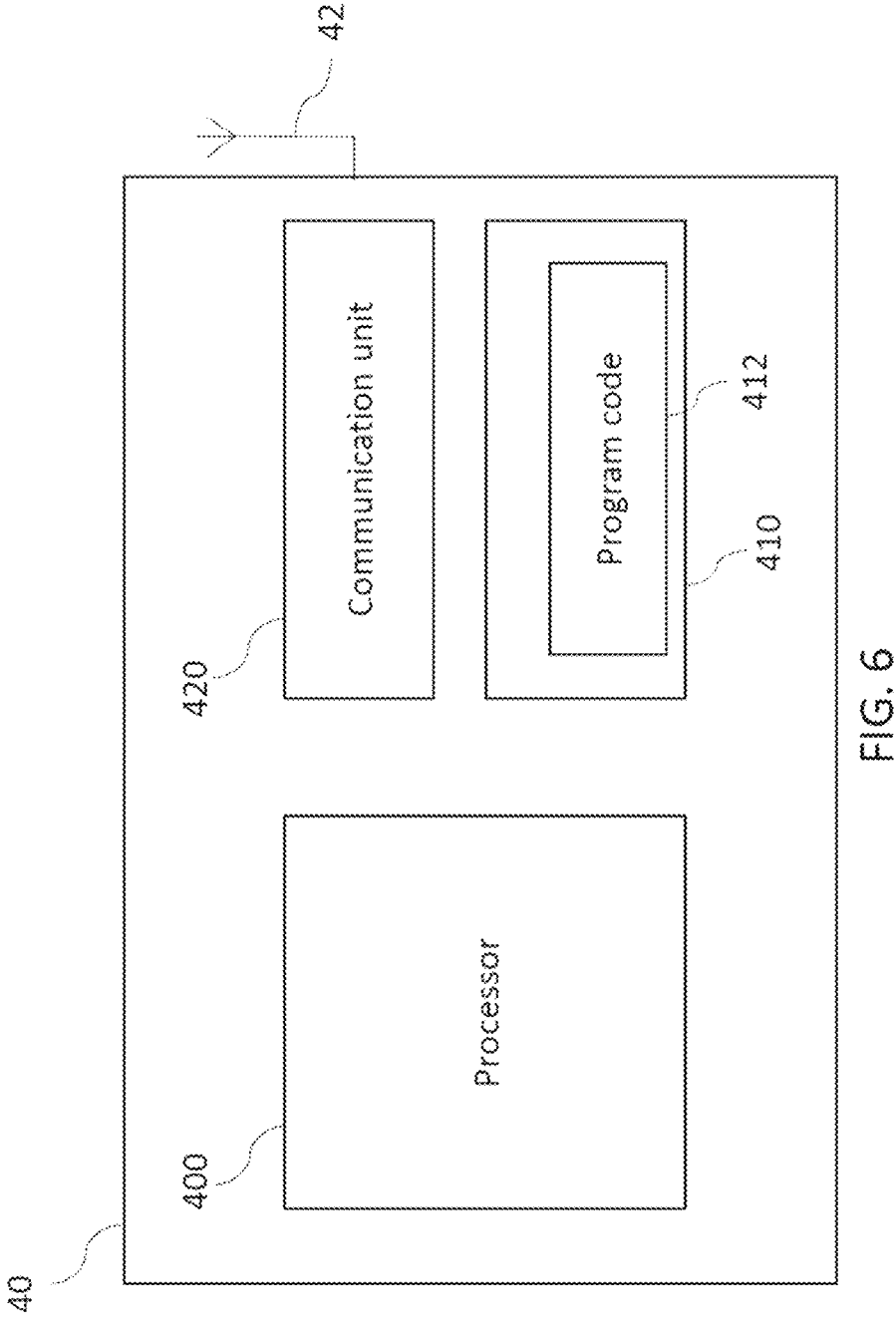
FIG. 6 shows a schematic diagram of a first wireless communication node according to an embodiment of the present disclosure.

FIG. 6 relates to a schematic diagram of a first wireless communication node 40 (e.g., a terminal device or a network device) according to an embodiment of the present disclosure. The first wireless communication node 40 may include a processor 400 such as a microprocessor or Application Specific Integrated Circuit (ASIC), a storage unit 410 and a communication unit 420. The storage unit 410 may be any data storage device that stores a program code 412, which is accessed and executed by the processor 400. The communication unit 420 may a transceiver and is used to transmit and receive signals (e.g. messages or packets) according to processing results of the processor 400. In an embodiment, the communication unit 420 transmits and receives the signals via at least one antenna 422.

In the case that the first wireless communication node 40 is a terminal device, the first wireless communication node 40 may be a user equipment (UE), a mobile phone, a laptop, a tablet computer, an electronic book or a portable computer system and is not limited herein. Embodiments of the storage unit 410 include but are not limited to a subscriber identity module (SIM), read-only memory (ROM), flash memory, random-access memory (RAM), hard-disk, and optical data storage device.

In the case that the first wireless communication node 40 is a terminal device, the first wireless communication node 40 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the first wireless communication node 40 may include (perform) at least one network function such as an access and mobility management function (AMF), a session management function (SMF), a user place function (UPF), a policy control function (PCF), an application function (AF), etc. Examples of the storage unit 510 include but are not limited to a SIM, ROM, flash memory, RAM, hard-disk, and optical data storage device.

In an embodiment, the storage unit 410 and the program code 412 may be omitted and the processor 400 may include a storage unit with stored program code.

The processor 400 may implement any one of the steps in exemplified embodiments on the first wireless communication node 40, e.g., by executing the program code 412.

The communication unit 420 may be a transceiver. The communication unit 420 may as an alternative or in addition be combining a transmitting unit and a receiving unit configured to transmit and to receive, respectively, signals to and from another wireless communication node.

In some embodiments, the first wireless communication node 40 can be used to perform the operations described above (e.g., operations in the method 100, and other relevant operations). In some embodiments, the processor 400 and the communication unit 420 collaboratively perform the operations described above. For example, the processor 400 performs operations and transmit or receive information through the communication unit 420.

In an embodiment, the processor 400 is configured to transmit, to another wireless communication node, a demodulation reference signal, DM-RS in first physical resource blocks, PRBs, of a plurality of PRBs according to an indictor provided by the wireless communication node or the another wireless communication node.

Details of operations of the first wireless communication node 40 can be ascertained with reference to the embodiments above, and will not be described herein.

Figure 7:
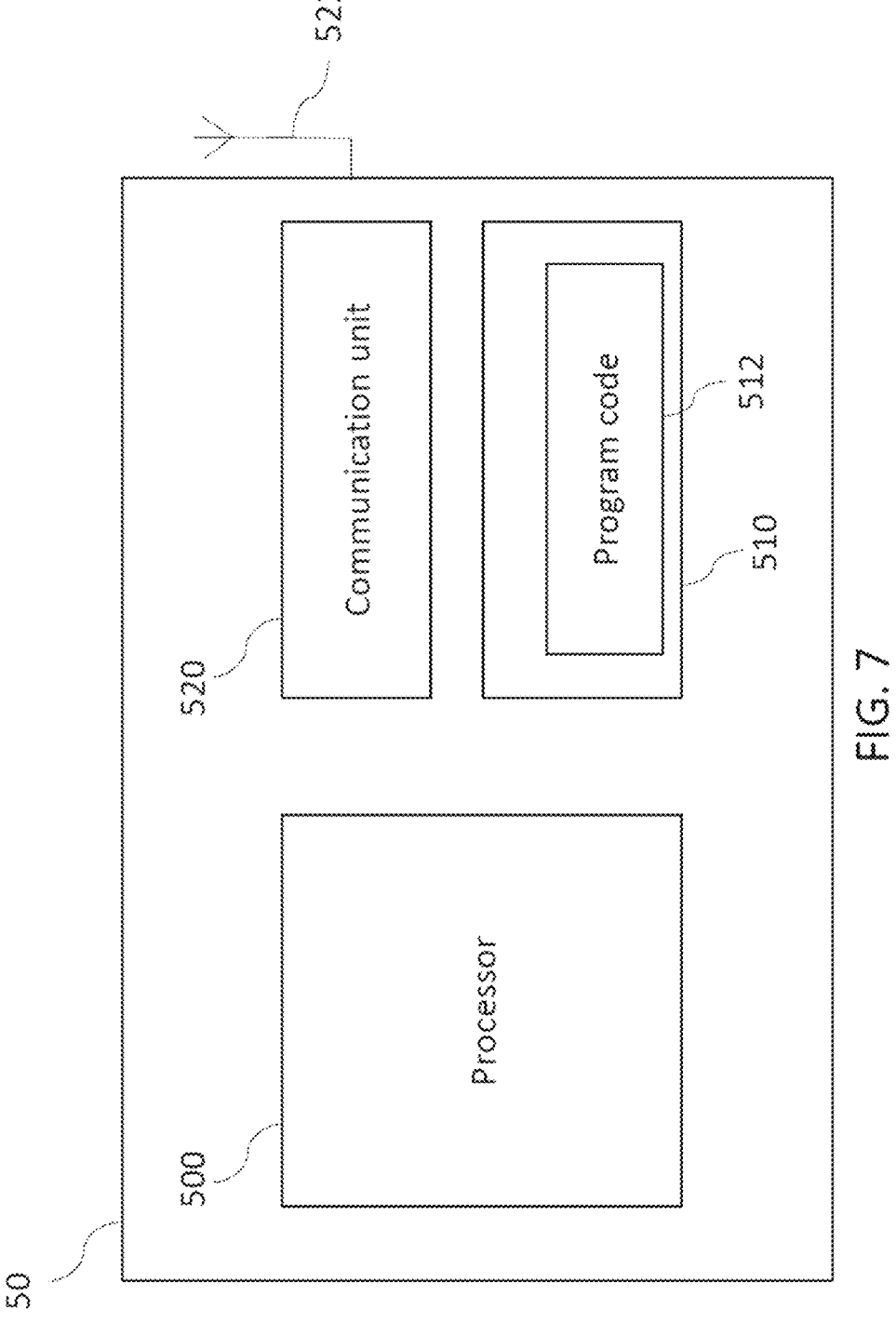
FIG. 7 shows a schematic diagram of a second wireless communication node according to an embodiment of the present disclosure.

FIG. 7 relates to a schematic diagram of a second wireless communication node 50 (e.g., a terminal device or a network device) according to an embodiment of the present disclosure. The second wireless communication node 50 may include a processor 500 such as a microprocessor or ASIC, a storage unit 510 and a communication unit 520. The storage unit 510 may be any data storage device that stores a program code 512, which is accessed and executed by the processor 500. The communication unit 520 may be a transceiver and is used to transmit and receive signals (e.g. messages or packets) according to processing results of the processor 500. In an example, the communication unit 520 transmits and receives the signals via at least one antenna 522.

In the case that the second wireless communication node 50 is a terminal device, the second wireless communication node 50 may be a user equipment (UE), a mobile phone, a laptop, a tablet computer, an electronic book or a portable computer system and is not limited herein. Embodiments of the storage unit 510 include but are not limited to a subscriber identity module (SIM), read-only memory (ROM), flash memory, random-access memory (RAM), hard-disk, and optical data storage device.

In the case that the second wireless communication node 50 is a terminal device, the second wireless communication node 50 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the second wireless communication node 50 may include (perform) at least one network function such as an access and mobility management function (AMF), a session management function (SMF), a user place function (UPF), a policy control function (PCF), an application function (AF), etc. Examples of the storage unit 510 include but are not limited to a SIM, ROM, flash memory, RAM, hard-disk, and optical data storage device.

In an embodiment, the storage unit 510 and the program code 512 may be omitted. The processor 500 may include a storage unit with stored program code.

The processor 500 may implement any steps described in exemplified embodiments on the second wireless communication node 50, e.g., via executing the program code 512.

The communication unit 520 may be a transceiver. The communication unit 520 may as an alternative or in addition be combining a transmitting unit and a receiving unit configured to transmit and to receive, respectively, signals to and from a communication device (e.g. a user equipment).

In some embodiments, the second wireless communication node 50 can be used to perform the operations described above (e.g., operations in the method 200, and other relevant operations). In some embodiments, the processor 500 and the communication unit 520 collaboratively perform the operations described above. For example, the processor 500 performs operations and transmit or receive signals through the communication unit 520.

In an embodiment, the processor 500 is configured to transmit, through the communication unit 520, a first or second downlink signal including Listen Before Talk, LBT, scheme switching information to make the wireless communication node switch from a first uplink LBT scheme to a second uplink LBT scheme.

In an embodiment, the processor 500 is configured to receive, from another wireless communication node, a demodulation reference signal, DM-RS, in first physical resource blocks, PRBs, of a plurality of PRBs according to an indictor provided by the first wireless communication node or the another wireless communication node.

Details of operations of the second wireless communication node 50 can be ascertained with reference to the embodiments above, and will not be described herein.

Another aspect of the present disclosure relates to a computer program product including a computer-readable program medium code stored thereupon, the code, when executed by a processor, causing the processor to implement a wireless communication method recited in any of foregoing methods.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:

transmitting, by a first wireless communication node to a second wireless communication node, a demodulation reference signal (DM-RS) in first physical resource blocks (PRBs) of a plurality of PRBs according to an indicator provided by the first wireless communication node or the second wireless communication node, wherein two adjacent first PRBs of the first PRBs are separated by one or more second PRBs not carrying DM-RS in the frequency domain, wherein the number of second PRBs is determined by the indicator;

wherein the first PRBs carrying the DM-RS are equally spaced or distributed in the frequency domain, wherein a gap between the first PRBs carrying the DM-RS is determined by the indicator;

wherein the indicator is provided by the first wireless communication node or the second wireless communication node via a Radio Resource Control (RRC) signaling or a Medium Access Control Control Element (MAC CE) command; and wherein the indicator is determined by one of following:
a PRB bundling size; or
a resource block group (RBG) size.

2. The wireless communication method of claim 1, wherein a number of the one or more second PRBs between the two adjacent first PRBs of the first PRBs not carrying DM-RS in the frequency domain corresponds to a PRB bundling size and the indicator provided by the first wireless communication node or the second wireless communication node;

wherein the PRB bundling size is larger than or equal to a predetermined threshold, and a number of the one or more second PRBs between the two adjacent first PRBs of the first PRBs not carrying DM-RS in the frequency domain is determined by the indicator provided by the first wireless communication node or the second wireless communication node; and wherein the number of the one or more second PRBs between the two adjacent first PRBs of the first PRBs not carrying DM-RS is less than the PRB bundling size.

3. The wireless communication method of claim 1, wherein a gap between the first PRBs carrying the DM-RS corresponds to a PRB bundling size and the indicator provided by the first wireless communication node or the second wireless communication node;

wherein the PRB bundling size is larger than or equal to a predetermined threshold; and wherein the gap between the first PRBs carrying the DM-RS is less than the PRB bundling size.

4. The wireless communication method of claim 1, wherein a number of the one or more second PRBs between the two adjacent first PRBs of the first PRBs not carrying DM-RS in the frequency domain corresponds to a resource block group (RBG) size;

wherein a number of the one or more second PRBs between the two adjacent first PRBs of the first PRBs not carrying DM-RS in the frequency domain corresponds to a RBG size and the indicator provided by the first wireless communication node or the second wireless communication node;

wherein the RBG size is larger than or equal to a predetermined threshold, and a number of the one or more second PRBs between the two adjacent first PRBs of the first PRBs not carrying DM-RS in the frequency domain is determined by the indicator provided by the first wireless communication node or the second wireless communication node;

wherein the number of the one or more second PRBs between the two adjacent first PRBs of the first PRBs not carrying DM-RS is less than the RBG size;

wherein a power of the DM-RS in the first PRBs is boosted corresponding to one or more second PRBs in the PRBs carrying no DM-RS;

wherein a power of the DM-RS in the first PRBs is boosted corresponding to a number of one or more second PRBs between two adjacent first PRBs of the first PRBs in the frequency domain;

wherein a power of the DM-RS in the first PRBs is boosted corresponding to the indicator provided by the first wireless communication node or the second wireless communication node;

wherein a power of the DM-RS in the first PRBs is operably boosted corresponding to the indicator and an upper limit of power boosting;

wherein the indicator is determined corresponding to an upper limit of power boosting;

wherein numbers of one or more second PRBs between two adjacent first PRBs of the first PRBs not carrying DM-RS in the frequency domain are the same in different time slots; and wherein energy per resource element (EPRE) of the power boosted DM-RS in the first PRBs are the same in different time slots.

5. The wireless communication method of claim 1, wherein a ratio of Physical Downlink Shared Channel (PDSCH) EPRE to a power boosted DM-RS EPRE corresponding the indicator is X dB, a ratio of PDSCH EPRE to DM-RS EPRE corresponding to the number of DM-RS CDM groups without data is Y dB, an upper limit of overall power boosting is Z dB, and X, Y, Z conform to:

$$|X|+|Y|\le|Z|$$

wherein X, Y, Z are non-positive numbers.

6. The wireless communication method of claim 1, wherein a ratio of PDSCH EPRE to a power boosted DM-RS EPRE corresponding to the number of DM-RS CDM groups without data is Y dB, an upper limit of overall power boosting is Z dB, and wherein $|Y|\ge|Z|$, and the first wireless communication node does not boost a power of the DM-RS in the first PRBs corresponding to the indicator.

7. The wireless communication method of claim 1, wherein a ratio of Physical Downlink Shared Channel (PDSCH) EPRE to a power boosted DM-RS EPRE corresponding to the indicator is estimated to be X dB, a ratio of PDSCH EPRE to DM-RS EPRE corresponding to the number of DM-RS CDM groups without data is Y dB, an upper limit of overall power boosting is Z dB, and wherein $|X|+|Y|\ge|Z|$, and the first wireless communication node does not boost a power of the DM-RS in the first PRBs corresponding to the indicator.

8. The wireless communication method of claim 1, wherein two adjacent first PRBs of the first PRBs are separated by one or more second PRBs in the frequency domain, the one or more second PRBs carry another DM-RS corresponding to another second wireless communication node;

wherein a frequency offset of the DM-RS carried by the first PRBs and a frequency offset of the DM-RS carried by the one or more second PRBs are different; and wherein the one or more second PRBs are used for interference measurement.

9. A wireless communication method comprising:

receiving, by a second wireless communication node from a first wireless communication node, a demodulation reference signal (DM-RS) in first physical resource blocks (PRBs) of a plurality of PRBs according to an indicator provided by the first wireless communication node or the second wireless communication node, wherein two adjacent first PRBs of the first PRBs are separated by one or more second PRBs not carrying DM-RS in the frequency domain, wherein the number of second PRBs is determined by the indicator;

wherein the first PRBs carrying the DM-RS are equally spaced or distributed in the frequency domain, wherein a gap between the first PRBs carrying the DM-RS is determined by the indicator;

wherein the indicator is provided by the first wireless communication node or the second wireless communication node via a Radio Resource Control (RRC) signaling or a Medium Access Control Control Element (MAC CE) command; and wherein the indicator is determined by one of following:
a PRB bundling size; or
a resource block group, RBG, size.

10. The wireless communication method of claim 9, wherein a number of the one or more second PRBs between the two adjacent first PRBs of the first PRBs not carrying DM-RS in the frequency domain corresponds to a PRB bundling size and the indicator provided by the first wireless communication node or the second wireless communication node;

wherein the PRB bundling size is larger than or equal to a predetermined threshold, and a number of the one or more second PRBs between the two adjacent first PRBs of the first PRBs not carrying DM-RS in the frequency domain is determined by the indicator provided by the first wireless communication node or the second wireless communication node; and wherein the number of the one or more second PRBs between the two adjacent first PRBs of the first PRBs not carrying DM-RS is less than the PRB bundling size.

11. The wireless communication method of claim 9, wherein a gap between the first PRBs carrying the DM-RS corresponds to a PRB bundling size and the indicator provided by the first wireless communication node or the second wireless communication node;

wherein the PRB bundling size is larger than or equal to a predetermined threshold, and a gap between the first PRBs carrying the DM-RS is determined by the indicator provided by the first wireless communication node or the second wireless communication node; and wherein the gap between the first PRBs carrying the DM-RS is less than the PRB bundling size.

12. The wireless communication method of claim 9, wherein a number of the one or more second PRBs between the two adjacent first PRBs of the first PRBs not carrying DM-RS in the frequency domain corresponds to a resource block group (RBG) size;

wherein a number of the one or more second PRBs between the two adjacent first PRBs of the first PRBs not carrying DM-RS in the frequency domain corresponds to a RBG size and the indicator provided by the first wireless communication node or the second wireless communication node;

wherein the RBG size is larger than or equal to a predetermined threshold, and a number of the one or more second PRBs between the two adjacent first PRBs of the first PRBs not carrying DM-RS in the frequency domain is determined by the indicator provided by the first wireless communication node or the second wireless communication node; and wherein the number of the one or more second PRBs between the two adjacent first PRBs of the first PRBs not carrying DM-RS is less than the RBG size.

13. The wireless communication method of claim 9, wherein a power of the DM-RS in the first PRBs is boosted corresponding to one or more second PRBs in the PRBs carrying no DM-RS;

wherein a power of the DM-RS in the first PRBs is boosted corresponding to a number of one or more second PRBs between two adjacent first PRBs of the first PRBs in the frequency domain;

wherein a power of the DM-RS in the first PRBs is boosted corresponding to the indicator provided by the first wireless communication node or the second wireless communication node;

wherein a power of the DM-RS in the first PRBs is operably boosted corresponding to the indicator and an upper limit of power boosting;

wherein the indicator is determined corresponding to an upper limit of power boosting;

wherein numbers of one or more second PRBs between two adjacent first PRBs of the first PRBs not carrying DM-RS in the frequency domain are the same in different time slots; and wherein energy per resource element (EPRE) of the power boosted DM-RS in the first PRBs are the same in different time slots.

14. The wireless communication method of claim 9, wherein a ratio of Physical Downlink Shared Channel (PDSCH) EPRE to a power boosted DM-RS EPRE corresponding the indicator is X dB, a ratio of PDSCH EPRE to DM-RS EPRE corresponding to the number of DM-RS CDM groups without data is Y dB, an upper limit of overall power boosting is Z dB, and X, Y, Z conform to:

$$|X|+|Y|\leq|Z|$$

wherein X, Y, Z are non-positive numbers.

15. The wireless communication method of claim 9, wherein a ratio of PDSCH EPRE to a power boosted DM-RS EPRE corresponding to the number of DM-RS CDM groups without data is Y dB, an upper limit of overall power boosting is Z dB, and wherein $|Y|\geq|Z|$, and the first wireless communication node does not boost a power of the DM-RS in the first PRBs corresponding to the indicator.

16. The wireless communication method of claim 9, wherein a ratio of Physical Downlink Shared Channel (PDSCH) EPRE to a power boosted DM-RS EPRE corresponding to the indicator is estimated to be X dB, a ratio of PDSCH EPRE to DM-RS EPRE corresponding to the number of DM-RS CDM groups without data is Y dB, an upper limit of overall power boosting is Z dB, and wherein $|X|+|Y|\geq|Z|$, and the first wireless communication node does not boost a power of the DM-RS in the first PRBs corresponding to the indicator.

17. The wireless communication method of claim 9, wherein two adjacent first PRBs of the first PRBs are separated by one or more second PRBs in the frequency domain, the one or more second PRBs carry another DM-RS corresponding to another second wireless communication node;

wherein a frequency offset of the DM-RS carried by the first PRBs and a frequency offset of the DM-RS carried by the one or more second PRBs are different; and wherein the one or more second PRBs are used for interference measurement.

18. A wireless communication node comprising:

a communication unit; and a processor configured to transmit, to another wireless communication node, a demodulation reference signal (DM-RS) in first physical resource blocks (PRBs) of a plurality of PRBs according to an indicator provided by the wireless communication node or the another wireless communication node, wherein two adjacent first PRBs of the first PRBs are separated by one or more second PRBs not carrying DM-RS in the frequency domain, wherein the number of second PRBs is determined by the indicator;

wherein the first PRBs carrying the DM-RS are equally spaced or distributed in the frequency domain, wherein a gap between the first PRBs carrying the DM-RS is determined by the indicator;

wherein the indicator is provided by the first wireless communication node or the second wireless communication node via a Radio Resource Control, RRC, signaling or a Medium Access Control Control Element, MAC CE, command; and wherein the indicator is determined by one of following:

a PRB bundling size; or a resource block group, RBG, size.

* * * * *